(12) United States Patent
Hoffmeister

(10) Patent No.: US 8,680,979 B2
(45) Date of Patent: Mar. 25, 2014

(54) COASTING PHASE INDICATION

(75) Inventor: Jan-Peter Hoffmeister, Leonberg (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 494 days.

(21) Appl. No.: 12/858,579

(22) Filed: Aug. 18, 2010

(65) Prior Publication Data

US 2011/0043346 A1 Feb. 24, 2011

(30) Foreign Application Priority Data

Aug. 18, 2009 (DE) .................. 10 2009 037 965

(51) Int. Cl.
*B60Q 1/00* (2006.01)

(52) U.S. Cl.
USPC ............. 340/438; 340/439; 340/441; 701/22; 701/70; 345/7

(58) Field of Classification Search
USPC ................. 340/435–436, 479, 901, 903–904, 340/438–439, 441, 456; 701/41, 45, 301, 701/302
See application file for complete search history.

(56) References Cited

U.S. PATENT DOCUMENTS

| | | | | |
|---|---|---|---|---|
| 4,677,556 A | * | 6/1987 | Habu | 701/64 |
| 4,731,727 A | * | 3/1988 | Rauch et al. | 701/123 |
| 4,853,673 A | * | 8/1989 | Kido et al. | 340/439 |
| 5,453,939 A | * | 9/1995 | Hoffman et al. | 702/183 |
| 5,457,439 A | * | 10/1995 | Kuhn | 340/435 |
| 5,815,072 A | * | 9/1998 | Yamanaka et al. | 340/461 |
| 5,916,293 A | * | 6/1999 | Katakura et al. | 701/67 |
| 6,009,365 A | * | 12/1999 | Takahara et al. | 701/54 |
| 6,386,351 B1 | * | 5/2002 | Salecker et al. | 192/54.1 |
| 6,694,806 B2 | * | 2/2004 | Kumagai et al. | 73/114.52 |
| 6,719,076 B1 | * | 4/2004 | Tabata et al. | 180/65.7 |
| 6,805,326 B1 | * | 10/2004 | Baier | 246/182 R |
| 6,840,126 B1 | * | 1/2005 | Stine et al. | 74/336 R |
| 6,898,506 B2 | * | 5/2005 | Kawai et al. | 701/84 |
| 6,951,525 B2 | * | 10/2005 | Ries-Mueller | 477/74 |
| 6,985,804 B2 | * | 1/2006 | Minami | 701/64 |
| 7,512,477 B2 | * | 3/2009 | Quigley et al. | 701/103 |
| 7,734,419 B2 | * | 6/2010 | Kondoh | 701/301 |
| 7,848,867 B2 | * | 12/2010 | Ueno | 701/70 |
| 7,935,024 B2 | * | 5/2011 | Winkel et al. | 477/80 |
| 8,026,801 B2 | * | 9/2011 | Saito et al. | 340/441 |
| 8,066,616 B2 | * | 11/2011 | Minamikawa | 477/15 |

(Continued)

FOREIGN PATENT DOCUMENTS

| | | |
|---|---|---|
| DE | 102 29 035 A1 | 1/2004 |
| DE | 103 07 462 A1 | 9/2004 |

OTHER PUBLICATIONS

Motohiko Hamada, Nissan's Accelerator Pedal Helps Drive Efficiently, Aug. 5, 2008, Nikkei Automotive Technology, http://techon.nikkeibp.co.jp/english/NEWS_EN/20080805/156031/.*

*Primary Examiner* — Daniel Wu
*Assistant Examiner* — Son M Tang
(74) *Attorney, Agent, or Firm* — Leydig, Voit & Mayer, Ltd.

(57) ABSTRACT

In a method for outputting information to the driver of a vehicle, the degree of deviation of a current operating point or value of an operating parameter of a drive unit and/or of a drive train of the vehicle from a predetermined range and/or a preferred range for entry to a coasting phase is indicated to the driver.

14 Claims, 1 Drawing Sheet

(56) References Cited

U.S. PATENT DOCUMENTS

| | | | |
|---|---|---|---|
| 8,112,203 B2 * | 2/2012 | Shin et al. | 701/51 |
| 8,116,971 B2 * | 2/2012 | Chen et al. | 701/123 |
| 8,192,327 B2 * | 6/2012 | Gibson et al. | 477/77 |
| 8,224,561 B2 * | 7/2012 | Kim et al. | 701/123 |
| 8,258,934 B2 * | 9/2012 | Filev et al. | 340/435 |
| 8,290,653 B2 * | 10/2012 | Hofbauer | 701/22 |
| 2006/0048516 A1 * | 3/2006 | Tenbrock et al. | 60/698 |
| 2006/0064225 A1 * | 3/2006 | Tabata et al. | 701/96 |
| 2007/0044758 A1 * | 3/2007 | Zhang | 123/350 |
| 2012/0078467 A1 * | 3/2012 | Schweikl et al. | 701/36 |

* cited by examiner

COASTING PHASE INDICATION

CROSS-REFERENCE TO RELATED APPLICATION

This application claims the priority, under 35 U.S.C. §119, of German application DE 10 2009 037 965.7, filed Aug. 18, 2009; the prior application is herewith incorporated by reference in its entirety.

BACKGROUND OF THE INVENTION

Field of the Invention

The invention relates to a method and a device for outputting information to the driver of a vehicle.

The invention can be applied in principle to any vehicles, in particular conventional vehicles, with an internal combustion engine, but also to hybrid vehicles, which have at least one electric machine in addition to an internal combustion engine.

The function of coasting in vehicles is known in practice and is used essentially to save fuel and/or to optimize energy efficiency. According to the terminology used in this text, the term "coasting" is understood to mean a driving condition in which no drive unit is introducing a torque into the drive train and hence either driving or braking the vehicle. To initiate coasting in the case of conventional vehicles with an internal combustion engine, the clutch can be disengaged, thereby decoupling the internal combustion engine, for example. In this case, the internal combustion engine can be stationary or running at idle.

Published, non-prosecuted German patent application DE 102 29 035 A1 discloses a method for controlling the drive unit of a vehicle in which extended overrun operation with reduced fuel consumption and reduced pollutant emissions is made possible. When overrun operation of the vehicle is detected, the transmission of an engine braking torque is interrupted. Transmission of the engine braking torque resumes in dependence on a driving situation or an operating condition of the drive unit.

Published, non-prosecuted German patent application DE 103 07 462 A1, corresponding to U.S. Pat. No. 6,951,525, describes a method for controlling the drive unit of a vehicle in which free-wheeling operation is set in dependence on a driving situation or an operating condition of the drive unit. In free-wheeling operation, the vehicle moves with the clutch disengaged. During the transition between driving operation with the clutch engaged and free-wheeling operation, an output variable of the drive unit is set to a constant value.

The practice of providing an indicator that enables coasting phases to be represented is already known from the two publications cited above. As before, however, there remains a need for a solution to, for example, the problem that the condition of coasting represents a very narrow range within the accelerator pedal characteristic when the accelerator pedal is being actuated, and this range is troublesome to select.

SUMMARY OF THE INVENTION

It is accordingly an object of the invention to provide a method and a device for outputting information to the driver of a vehicle which overcome the above-mentioned disadvantages of the prior art methods and devices of this general type, which ensures that the driver can adopt the driving condition of coasting as conveniently as possible.

In the method for outputting information to the driver of a vehicle, the degree of deviation of a current operating point or value of a current operating parameter of a drive unit and/or of a drive train of the vehicle from a predetermined range and/or a preferred range for entry to the coasting phase is indicated to the driver. It is, of course, possible for information on the degree of deviation to be represented in any conceivable way, in particular so as to be perceptible haptically and/or acoustically and/or visually. For example, provision can be made to enable the "coasting" function to be activated only when the current operating parameter or operating point is within the predetermined and/or preferred range.

According to one variant embodiment of the method according to the invention, the predetermined and/or preferred range is selected on the basis of at least one particular criterion.

In the interests of increasing economy of operation, the criterion can relate to the optimization of the energy efficiency of the drive unit.

In one variant embodiment of the method according to the invention, the drive unit contains an internal combustion engine. In view of the increasing importance of protecting the environment and the climate, it is particularly advantageous if the criterion relates to the minimization of pollutant emissions and/or the optimization of the fuel consumption of the internal combustion engine.

In one variant embodiment of the method according to the invention, information on the degree of deviation is represented visually by an indicator. Visual representation is easier for the driver to handle than other methods of representation, and allows the information to be grasped quickly and accurately.

According to one embodiment of the method according to the invention, the degree of deviation of the current operating point or operating parameter of the drive unit from the predetermined range is represented to the driver in coded form. For example, the color "red" is associated with a comparatively large deviation, and the color "green" is associated with a deviation that is only small. The colors can be rendered by appropriate LEDs or by a color display, for example.

According to one embodiment of the method according to the invention, the information on the degree of deviation of the current operating point or operating parameter of the drive unit from the predetermined range is projected onto the windshield of the vehicle by an optical element of a head-up display, eliminating the need for additional installation space in the region of the instrument panel.

A particularly accessible and clear representation is obtained if the predetermined and/or preferred range is represented in an indication area of an indicator, and a field in a bar graph is filled in accordance with the current value of the operating parameter.

According to one embodiment of the method according to the invention, the information on the degree of deviation is rendered as spoken and/or written text.

One significant advantage of the invention is that it makes it easier for the driver to select the operating point or the operating range of coasting, and this helps to increase the number of coasting phases and thus, ultimately, to make the use of fuel or energy more economical.

Other features which are considered as characteristic for the invention are set forth in the appended claims.

Although the invention is illustrated and described herein as embodied in a method and a device for outputting information to the driver of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
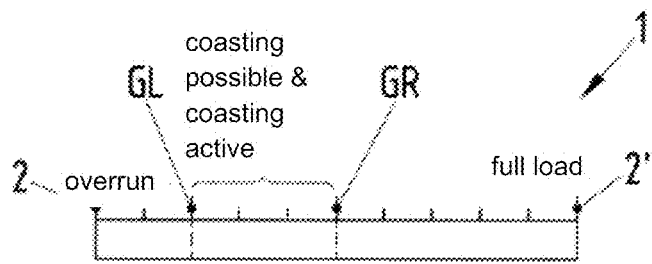
FIG. 1 is an illustration of a scale, associated with a vehicle with an internal combustion engine, for indicating a current load condition of an internal combustion engine according to the invention.

Referring now to the figures of the drawing in detail and first, particularly, to FIG. 1 thereof, there is shown schematically a scale 1 that is provided in an instrument cluster of a vehicle which has an internal combustion engine and is equipped with a coasting function, and it serves to indicate a current load condition of the internal combustion engine.

The indication range of the scale 1 extends from a left-hand scale edge 2, which is associated with the "overrun" operating condition of the internal combustion engine, and a right-hand scale edge 2', which is associated with the "full load" operating condition of the internal combustion engine.

A range of the scale 1 which is bounded by a left-hand limiting value GL and a right-hand limiting value GR defines a load condition range of the internal combustion engine which is preferred for entry to the coasting phase. A field 3 in the bar graph is filled in accordance with the current value of a parameter which characterizes the load condition of the internal combustion engine.

The limiting values GL, GR are specified or determined in such a way that the adoption of the "coasting" driving condition, e.g. for reasons of economy or, for example, for technical reasons, so as to avoid load jumps when entering/emerging from the coasting function and hence to avoid exposing the drive train to excessive loads, is advantageous and/or necessary when the current value of the parameter which characterizes the load condition of the internal combustion engine is within the range between the limiting values GL, GR.

An application can be used to provide a freely selectable graduation of the scale 1.

FIGS. 2 to 5 show the scale 1 from FIG. 1 in the condition where it is indicating various different load conditions of the internal combustion engine.

In all of FIGS. 1 to 7, the operating point is indicated symbolically by a stylized cursor 5.

Figure 2:
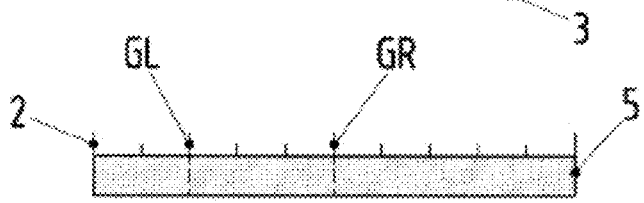
FIGS. 2 to 5 are illustrations showing the scale from FIG. 1 in the condition where it is indicating various different load conditions of the internal combustion engine while the method according to the invention is being carried out.
Figure 3:
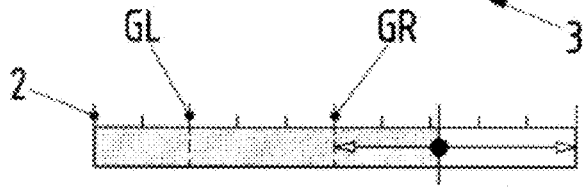
Figure 4:
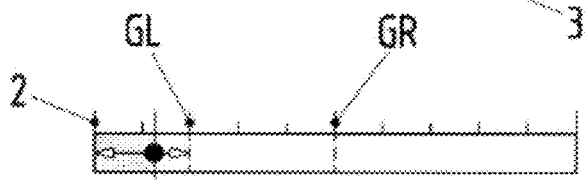
Figure 5:
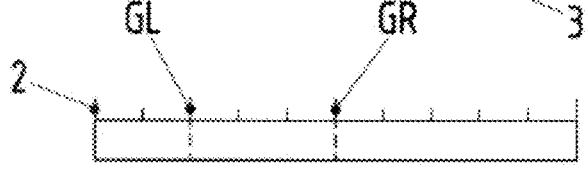

In particular, FIG. 2 shows the scale 1 in the condition where it is indicating the "full load in traction" load condition of the internal combustion engine, FIG. 3 shows the scale 1 in the condition where it is indicating the "partial load in traction" load condition of the internal combustion engine, FIG. 4 shows the scale 1 in the condition where it is indicating the "slight overrun" load condition of the internal combustion engine, while FIG. 5 shows the scale 1 in the condition where it is indicating the "maximum overrun" load condition of the internal combustion engine.

To summarize, the driver can thus see at any time how close he is to the operating point or operating range of coasting, and can take this information into account in the deliberate selection of coasting operation.

Figure 6:
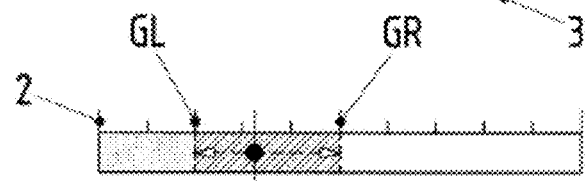
FIG. 6 is an illustration showing the scale in the condition where it is indicating that the "coasting" function can be activated.

FIG. 6 shows the scale 1 in the condition where it is indicating that the "coasting" function can be activated, i.e. the load condition of the internal combustion engine at that moment has a value at which the "coasting" function can be activated. A variable bar does not now appear on the scale 1; instead, the area of the field 3 between the left-hand scale edge 2 and the left-hand limiting value GL is filled in order in this way to indicate to the driver that the "coasting" function can be activated at this time.

Figure 7:
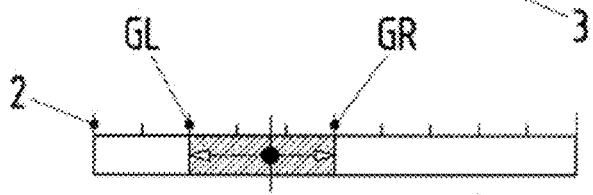
FIG. 7 is an illustration showing the scale in the condition where it is indicating that the "coasting" function is active.

FIG. 7 shows the scale 1 in the condition where it is indicating that the "coasting" function is active. Again, a variable bar does not appear on the scale 1; instead, the area of the field 3 between the limiting values is now filled in order in this way to indicate to the driver that the "coasting" function is active. Indication of the load condition can be activated and/or deactivated automatically in response to a user instruction or in a manner dependent on particular preconditions.

The invention claimed is:

1. A method for outputting information to a driver of a vehicle, the method comprising:
defining a predetermined range of a value of an operating parameter of a drive unit or drive train of a vehicle for an entry point to a coasting phase, in which no drive unit is introducing torque into the drive train, wherein the operating parameter is a torque output by the drive unit; and
indicating to the driver a degree of deviation of a current value of the operating parameter of the drive unit or drive train from the predetermined range.

2. The method according to claim 1, wherein the predetermined range is specified on a basis of at least one particular criterion.

3. The method according to claim 2, wherein the particular criterion relates to an optimization of energy efficiency of the drive unit.

4. The method according to claim 2, wherein the drive unit comprises an internal combustion engine, and the particular criterion relates to at least one of a minimization of pollutant emissions and an optimization of fuel consumption of the internal combustion engine.

5. The method according to claim 1, which further comprising visually representing information on the degree of deviation by means of an indicator.

6. The method according to claim 5, which further comprises representing the degree of deviation to the driver in a color-coded form.

7. The method according to claim 5, which further comprises projecting information on the degree of deviation onto a windshield of a vehicle by means of an optical element of a head-up display.

8. The method according to claim 5, wherein the predetermined range is represented in an indication area of an indicator, and a field in a bar graph is filled in accordance with a current value of the operating parameter.

9. The method according to claim 1, wherein the information on the degree of deviation is rendered as at least one of spoken and written text.

10. A device for outputting information to a driver of a vehicle, the device comprising:

an apparatus for indicating to the driver a degree of deviation of a current operating parameter of a drive unit which drives the vehicle from a predetermined range for entry to a coasting phase, in which no drive unit is introducing torque into a drive train, wherein the operating parameter is a torque output by the drive unit.

11. The device, according to claim 10, wherein said apparatus has an indicator, by means of which information on the degree of deviation can be represented visually.

12. The device according to claim 11, wherein said apparatus is configured to represent the degree of deviation to the driver in a color-coded form.

13. The device according to claim 11, wherein said indicator is a component of an instrument cluster.

14. The device according to claim 10, wherein said apparatus renders the information on the degree of deviation as at least one of spoken and written text.

* * * * *